US010673262B2

(12) United States Patent
Miyazaki et al.

(10) Patent No.: US 10,673,262 B2
(45) Date of Patent: Jun. 2, 2020

(54) ELECTRIC DEVICE HAVING FUNCTION OF INFORMING BATTERY RESIDUAL CAPACITY

(71) Applicant: FANUC CORPORATION, Minamitsuru-gun, Yamanashi (JP)

(72) Inventors: Yoshito Miyazaki, Yamanashi (JP); Yasumichi Sakoda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/260,518

(22) Filed: Sep. 9, 2016

(65) Prior Publication Data

US 2017/0077731 A1    Mar. 16, 2017

(30) Foreign Application Priority Data

Sep. 10, 2015   (JP) ................................ 2015-178445

(51) Int. Cl.
*H02J 7/00* (2006.01)
*H01M 10/48* (2006.01)
(Continued)

(52) U.S. Cl.
CPC ....... *H02J 7/0068* (2013.01); *H01M 10/0445* (2013.01); *H01M 10/425* (2013.01);
(Continued)

(58) Field of Classification Search
CPC .................................................... H02J 7/0068
See application file for complete search history.

(56) References Cited

U.S. PATENT DOCUMENTS 5,061,898 A    10/1991  Oram et al.
5,637,982 A *  6/1997  Nanno .................. H02J 7/0068
                                                       320/150
(Continued)

FOREIGN PATENT DOCUMENTS

CN     101379409 A    3/2009
CN     103901348 A    7/2014
(Continued)

OTHER PUBLICATIONS

Japanese Office Action for Japanese Application No. 2015-178445, dated Sep. 5, 2017 with translation, 7 pages.
(Continued)

*Primary Examiner* — Daniel Kessie
(74) *Attorney, Agent, or Firm* — RatnerPrestia (57) ABSTRACT

An electric device according to the present invention includes: a first power source which supplies electric power to a predetermined load unit; a second power source which supplies electric power from an outside power source to the load unit; a switching unit which switches the first power source and the second power source which supply electric power to the predetermined load unit; a time measuring unit which measures the time; a voltage measuring unit which measures terminal voltage of the first power source; a storage unit which stores the terminal voltage of the first power source measured by the measuring unit and the time when the terminal voltage of the first power source is measured based on the time measuring unit; a time change rate calculating unit which calculates a time change rate of the terminal voltage of the first power source stored in the storage unit; and an informing unit which performs informing operation with respect to a residual capacity of the first power source in accordance with the time change rate of the terminal voltage of the first power source calculated by the time change rate calculating unit.

6 Claims, 6 Drawing Sheets

(51) Int. Cl.
*H01M 10/04* (2006.01)
*H01M 10/42* (2006.01)
*H01M 10/44* (2006.01)
*H02J 9/06* (2006.01)

(52) U.S. Cl.
CPC .......... *H01M 10/44* (2013.01); *H01M 10/48* (2013.01); *H01M 10/486* (2013.01); *H02J 7/0047* (2013.01); *H02J 9/06* (2013.01); *H01M 2010/4271* (2013.01); *H01M 2010/4278* (2013.01); *H02J 7/0048* (2020.01)

(56) References Cited

U.S. PATENT DOCUMENTS

| | | |
|---|---|---|
| 2002/0153865 A1 | 10/2002 | Nelson et al. |
| 2007/0210650 A1* | 9/2007 | Togashi ............. G06F 11/1441 307/43 |
| 2009/0024338 A1 | 1/2009 | Suzuki |
| 2014/0167706 A1* | 6/2014 | Sun ...................... H02J 7/0081 320/160 |

FOREIGN PATENT DOCUMENTS

| | | |
|---|---|---|
| CN | 104614679 A | 5/2015 |
| JP | 0318224 A | 1/1991 |
| JP | 08126214 A | 5/1996 |
| JP | 0954146 A | 2/1997 |
| JP | H 09-178827 A | 7/1997 |
| JP | 2001185233 A | 7/2001 |

OTHER PUBLICATIONS

Chinese Office Action for Application No. 201610815872.2, dated Oct. 18, 2018 with English translation, 16 pages.
German Examination Report for German Application No. 10 2016 010 814.2, dated Aug. 20, 2019, with translation, 8 pages.

* cited by examiner

| TEMPERATURE (°C) | X1 | X2 | X3 | X4 | ... | $X_{n-2}$ | $X_{n-1}$ | Xn |
|---|---|---|---|---|---|---|---|---|
| CORRECTION AMOUNT (V) | ΔV1 | ΔV2 | ΔV3 | ΔV4 | ... | $ΔV_{n-2}$ | $ΔV_{n-1}$ | ΔVn |

ELECTRIC DEVICE HAVING FUNCTION OF INFORMING BATTERY RESIDUAL CAPACITY

BACKGROUND OF THE INVENTION

1. Field of the Invention

The present invention relates to an electric device, in particular to an electric device having a function of informing a battery residual capacity.

2. Description of the Related Art

A numerical controller (CNC) requires various parameters to be set and input thereto in order to activate a processing machine. Since a re-input of the parameters is difficult due to a remarkable large number of parameters and a frequency to change the input parameters is low, the parameters are stored and held in a nonvolatile memory after the CNC is turned off. Generally, a SRAM, which is backed up by a battery (cell), is used as the nonvolatile memory.

However, in the SRAM backed up by the battery, the parameters stored in the SRAM disappear in case of a battery life end. Thus, a battery residual capacity is monitored.

Presumption methods of the battery residual capacity are known. These method are mainly classified into the following two methods.

(i) A consumption capacity is presumed by integrating an electric current value by discharging time.

(ii) A capacity is presumed from a time transition by making a graph of a time series of terminal voltage.

Figure 8:
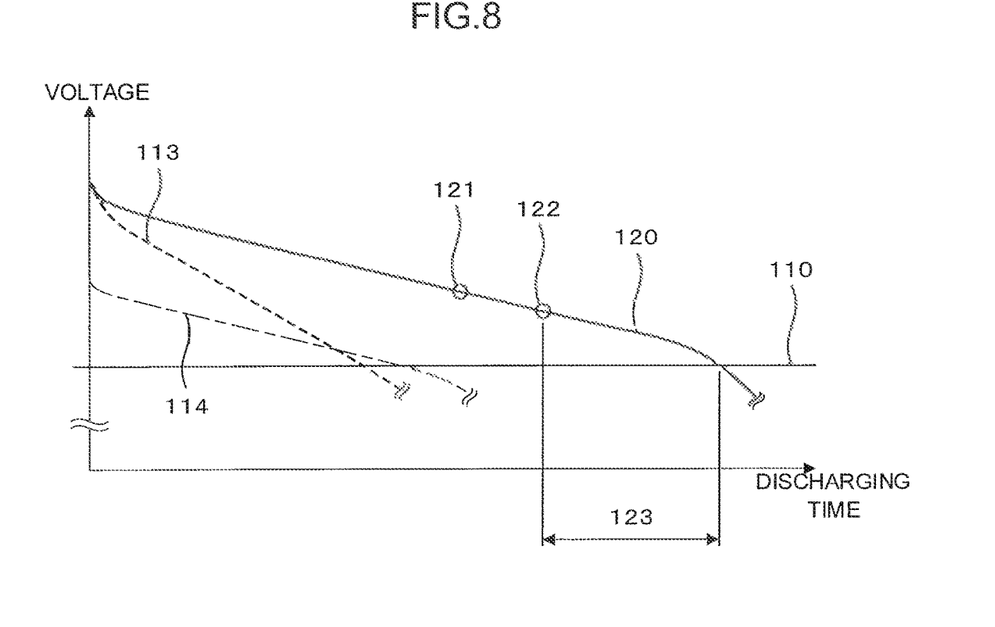
FIG. 8 is a graph showing a discharging characteristic of the battery in a predetermined load state.

In a method disclosed in JP 09-178827 A (see FIG. 8), a residual time of a battery 123 is obtained by an approximate straight line approximated from a curve line 120. In FIG. 8, a horizontal axis denotes discharging time, and a vertical axis denotes voltage of the battery. A straight line 110 denotes end voltage by which an electric device can be performed under a load state. A curve line 120 denotes a discharging characteristic of a high performance battery, and a curve line 113 denotes a discharging characteristic of a standard battery, and a curve line 114 denotes a discharging characteristic of a rechargeable battery.

There is an electric device having a backup battery which is not used when an outer power source is turned on but is used when the outer power source is turned off. For example, in a numerical controller which controls a processing machine, since backup electric current is supplied while the device is turned off, measuring the backup electric current is difficult.

Figure 9:
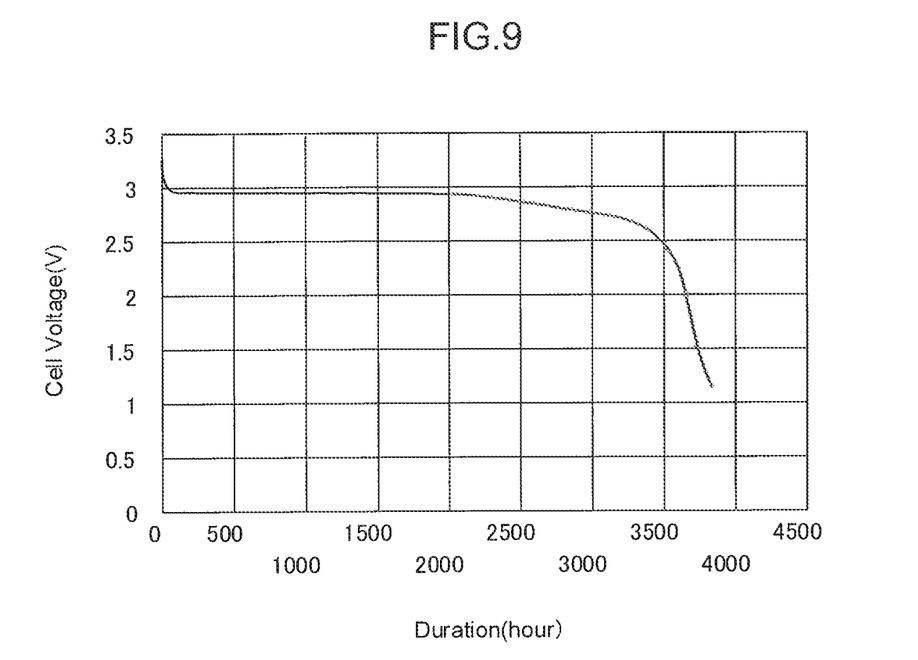
FIG. 9 is a graph showing a discharging characteristic of a manganese dioxide lithium battery according to Company A.
Figure 10:
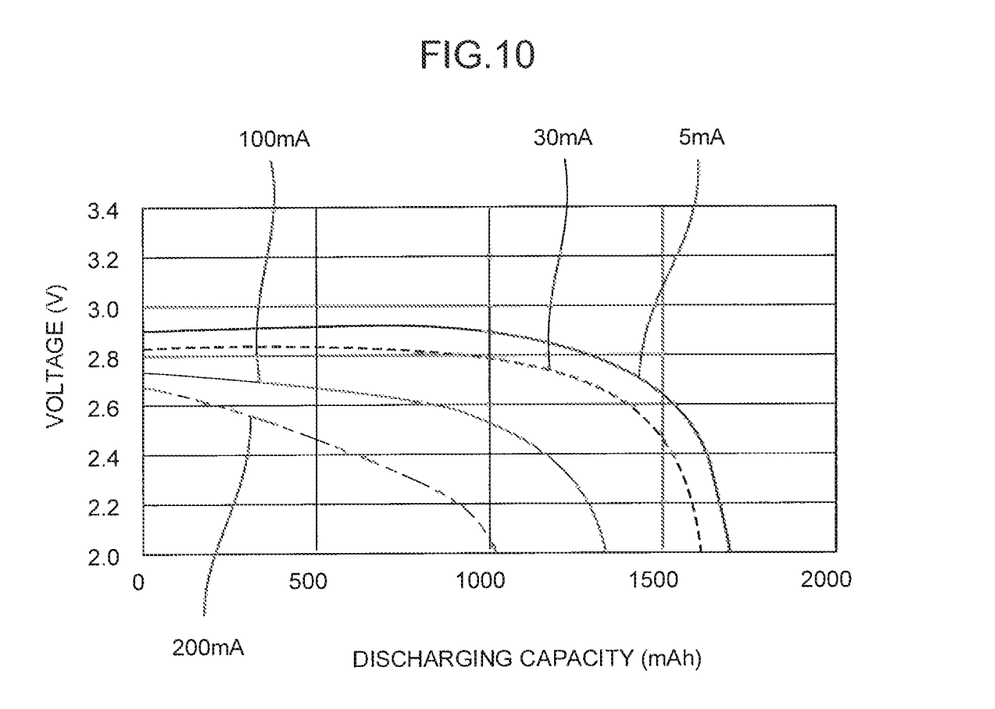
FIG. 10 is a graph showing a discharging characteristic of a manganese dioxide lithium battery according to Company B.

Further, in a case in which a discharging characteristic (battery residual capacity) of the battery is unable to be approximated by a straight line (primary expression), for example, in a manganese dioxide lithium battery, since the discharging characteristic of the manganese dioxide lithium battery is unable to be approximated by a straight line (see FIGS. 9 and 10), a technique disclosed in JP 09-1778827 A cannot be adopted.

SUMMARY OF THE INVENTION

Accordingly, an object of the present invention is, in consideration of the aforementioned problem of the conventional technique, to provide an electric device having a function of informing residual capacity of a battery in several stages in which the residual capacity of the battery is difficult to be approximated by a primary expression.

An electric device according to the present invention includes: a first power source which supplies electric power to a predetermined load unit; a second power source which supplies electric power from an outside power source to the load unit; a switching unit which switches the first power source and the second power source which supply electric power to the predetermined load unit; a time measuring unit which measures the time; a voltage measuring unit which measures terminal voltage of the first power source; a storage unit which stores the terminal voltage of the first power source measured by the measuring unit and the time when the terminal voltage of the first power source is measured based on the time measuring unit; a time change rate calculating unit which calculates a time change rate of the terminal voltage of the first power source stored in the storage unit; and an informing unit which performs informing operation with respect to a residual capacity of the first power source in accordance with the time change rate of the terminal voltage of the first power source calculated by the time change rate calculating unit.

Here, a first power source is a battery incapable of informing a battery residual capacity correctly because an error amount of a battery residual capacity approximated by a primary expression against a real battery residual capacity is large (namely, the battery with the battery residual capacity being unable to be approximated by a primary expression).

In the electric device, the switching unit switches electric power supply to the load unit to the second power source from the first power source after a predetermined time is passed since the outside power source which supplies the electric power to the electric device is turned on.

The electric device further includes: a temperature measuring unit which measures temperature of the first power source; and a correcting unit which corrects the terminal voltage of the first power source measured by the measuring unit based on the temperature measured by the temperature measuring unit, and the terminal voltage of the first power source corrected by the correcting unit may be stored as the terminal voltage of the first power source in the storage unit.

In the electric device, the correcting unit may correct the measured terminal voltage of the first power source by using an approximate expression having a degree of more than 1 or a correction table.

In the electric device, the informing unit may inform a warning when the time change rate of the terminal voltage of the first power source exceeds a predetermined value.

In the electric device, the temperature measuring unit may measure the temperature of the first power source when the terminal voltage of the first power source is measured by the voltage measuring unit, and the storage unit may store the measured temperature together with the terminal voltage of the first power source and the time.

According to the present invention, the electric device having the function of informing the battery residual capacity of the battery in several stages in which the residual capacity of the battery is difficult to be approximated by the primary expression can be provided.

BRIEF DESCRIPTION OF THE DRAWINGS

The aforementioned and other objects and features of the present invention will be readily understood by reading the following detailed description of embodiments with reference to the accompanying drawings. In the drawings.

DETAILED DESCRIPTION OF THE PREFERRED EMBODIMENTS

Hereinafter, embodiments of the present invention are described with reference to drawings.

Figure 1:
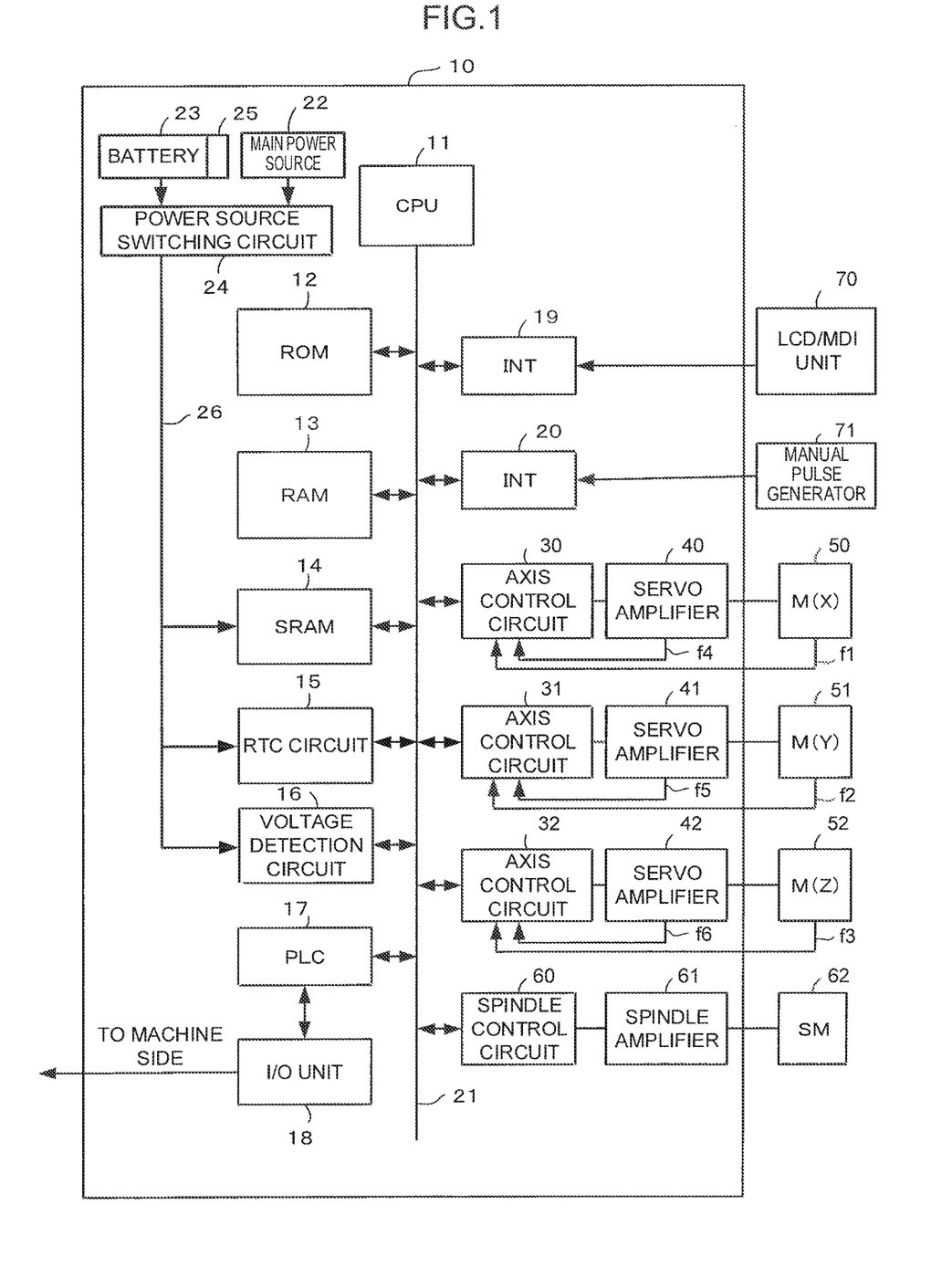
FIG. 1 is a schematic diagram showing a configuration of a numerical controller.

FIG. 1 is a schematic block diagram of a numerical controller which controls a processing machine. The numerical controller 10 is formed as an electric device in which a processor (CPU) 11 reads a system program stored in a ROM 12 via a bus 21 and controls the whole of the numerical controller 10 in accordance with the system program. A temporary calculation data, a display data and the like are stored in a RAM 13. A SRAM 14 is formed as a nonvolatile memory which is backed up by a battery 23 and stores a system parameter, a processing program, a tool offset value and the like which should be held after a main power source 22 of the numerical controller 10 is turned off. A memory region 14a is provided in the SRAM 14, and a necessary data for calculating a battery residual capacity is stored in the memory region 14a. The main power source 22 receives a power supply from the outside, for example DC 24 volts, and the voltage is adjusted to be suitable voltage for the SRAM 14 and an RTC (Real Time Clock) and supplied.

Figure 2:
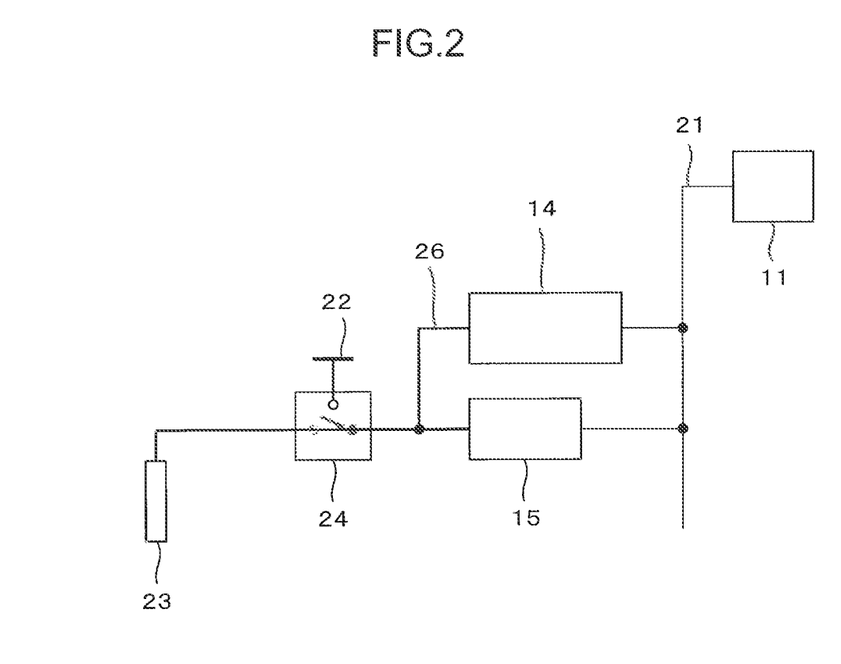
FIG. 2 is a circuit diagram showing a switching of a main power source and a battery by a power source switching circuit to connect a SRAM and an RTC circuit to the power source.

An RTC circuit 15 is similar to a general digital clock and counts the time by using a crystal oscillator activated by the battery 23, and its output data can be read from the CPU 11. A voltage detection circuit 16 is a measuring circuit which detects terminal voltage of the battery 23. A power source switching circuit 24 switches the main power source 22 and the battery 23 such that a circuit (load unit) whose backup is necessary is connected to the main power source 22 when the main power source 22 is turned on and connected to the battery 23 when the main power source 22 is turned off. Electric power is supplied to a load (SRAM 14, RTC circuit 15) from the main power source 22 or the battery 23 via a power supply line 26. In FIG. 2, power supply to the SRAM 14 and the RTC circuit 15 as a predetermined load is backed up by the battery 23. A temperature detector 25 which detects a temperature of the battery 23 is arranged on or around the battery 23. The temperature detector 25 may be arranged within a region capable of detecting value having a correlation with the temperature of the battery 23.

A PLC (Programmable Logic Controller) 17 controls the processing machine (not shown) by embedded sequence programs. Namely, a signal required in the processing machine is generated by the sequence programs in accordance with a function ordered in a processing program, and the signal is output to the processing machine from an I/O unit 18. Various actuators in the processing machine are operated by the output signal.

A signal of information with respect to present position of each axis, weight of movable part, an alarm, an image data or the like is sent to a display device of an LCD/MDI unit 70 and the information is displayed on the display device. Here, the MDI denotes a manual input device such as a keyboard. An interface 19 receives a data from the keyboard of the LCD/MDI unit 70 and sends the data to the processor (CPU) 11. An interface 20 is connected to a manual pulse generator 71 and receives a pulse from the manual pulse generator 71. The manual pulse generator 71 is installed in a machine operation panel on the processing machine and used for manually positioning a machine movable part precisely.

Axis control circuits 30 to 32 receive movement commands of respective axes from the processor (CPU) 11 and output the commands of respective axes to servo amplifiers 40 to 42. As receiving the commands, the servo amplifiers 40 to 42 drive servo motors 50 to 52 of respective axes arranged in a mechanism part (not shown) in the processing machine. Position velocity detectors (not shown) which detect a position and a velocity are embedded in the servo motors 50 to 52 of respective X-, Y-, and Z-axes. A feedback signals (f1, f2, f3) (hereinafter referred to as velocity feedback value) from the position velocity detectors are fed back to the axis control circuits 30 to 32. Further, position feedback signals (hereinafter referred to as position feedback value) are fed back to the axis control circuits 30 to 32. Further, electric current sensors (not shown) which detect driving current for driving the servo motors 50 to 52 are embedded in the servo amplifiers 40 to 42, and feedback signals (f4, f5, f6) (hereinafter referred to as electric current feedback value) from the electric current sensors are fed back to the axis control circuits 30 to 32.

A servo control CPU embedded in the axis control circuits 30 to 32 performs respective processing of a position loop, a velocity loop, and an electric current loop of the respective axes based on these feedback values and the movement commands and controls the position and the velocity of the respective axes of the servo motors 50 to 52. These controls are based on the conventional well-known control loops. A spindle control circuit 60 receives a spindle rotation command and outputs a spindle velocity signal to a spindle amplifier 61. The spindle amplifier 61 receives the spindle velocity signal and rotates a spindle motor 62 at a commanded rotational velocity.

FIG. 2 is a circuit diagram showing a switching of the main power source and the battery by the power source switching circuit to connect the SRAM and the RTC circuit to the power source. When the numerical controller 10 is activated and electric power is supplied from the main power source 22 as an outside power source, the power source switching circuit 24 switches a backup electric power supply to the main power source 22 from the battery 23. The switching of the power source is not performed right after the numerical controller 10 is activated, and therefore this configuration makes it possible to detect the terminal voltage of the battery 23 by using the voltage detection circuit 16 in a state in which the battery 23 is connected to the load (SRAM 14, RTC circuit 15). In other words, the switching from the battery 23 to the main power source 22 is performed when a predetermined time is passed since the outside power source is turned on. With such a configuration, the terminal voltage of the battery 23 can be detected precisely by the voltage detection circuit 16 in a state in which the battery 23 is connected to the load (SRAM 14, RTC circuit 15).

The predetermined time generally corresponds to a several tens of minutes, however a user may set a setting time as the predetermined time for the switching time in the numerical controller. Further, the numerical controller may set the setting time automatically based on a turn-off time stored in the numerical controller. By setting the setting time until the switching after the turn-on to be longer when the turn-off time is longer and setting the setting time until the switching after the turn-on to be shorter when the turn-off time is shorter, consumption of the battery can be saved.

The detected voltage value is stored in the SRAM 14 via the bus 21. At this time, the time when the terminal voltage of the battery 23 is detected by the voltage detection circuit 16 is acquired based on output of the RTC circuit 15, and the time is stored in the SRAM 14 together with the detected voltage value of the battery 23. A cumulative time of the turn-off period of the numerical controller may be calculated based on the time acquired by using the RTC circuit 15 and the calculated value may be stored in the SRAM 14. The detected voltage value or the data of the temperature may not be stored in the SRAM 14 but stored in other memory installed in the numerical controller 10.

Figure 3:
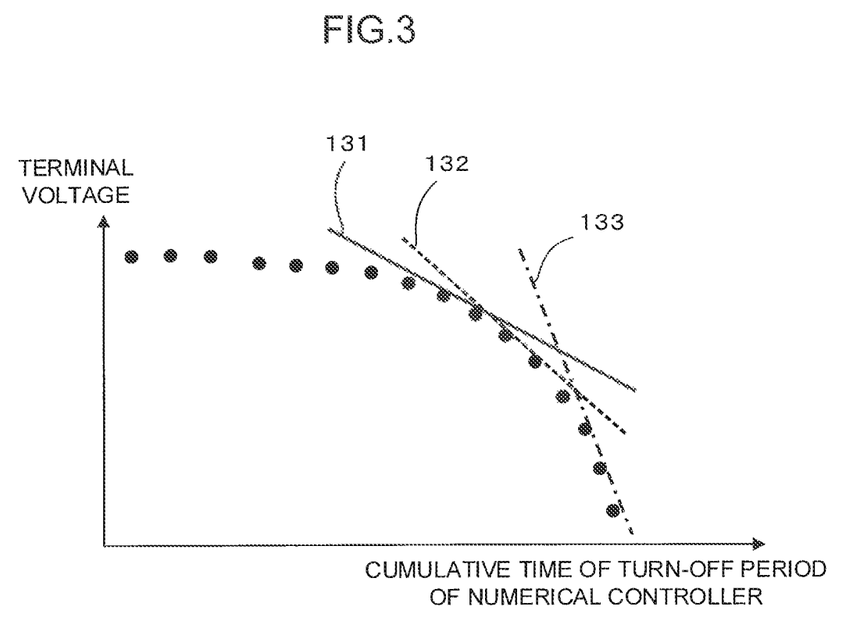
FIG. 3 is a graph showing a relationship between terminal voltage of the battery and a cumulative time of a turn-off period of the numerical controller.

FIG. 3 is a graph showing a relationship between the terminal voltage of the battery and the cumulative time of the turn-off period of the numerical controller. As described with reference to FIGS. 1 and 2, the terminal voltage of the battery 23 is detected by the voltage detection circuit 16. In FIG. 3, a vertical axis denotes the terminal voltage, and a horizontal axis denotes the cumulative time of the turn-off period of the numerical controller. Here, a change rate of the terminal voltage against the cumulative time of the turn-off period of the numerical controller is calculated. Decrease of the terminal voltage indicates decrease of the residual capacity of the battery 23. As the terminal voltage is decreased, magnitude of a negative inclination of the change rate of the terminal voltage against the cumulative time of the turn-off period of the numerical controller becomes larger. The residual capacity of the battery 23 in reference number 132 is smaller than that in reference number 131, further the battery residual capacity in reference number 133 is smaller than that in the reference number 132. A warning of the battery residual capacity may be output in accordance with the inclination (time change rate of the terminal voltage).

The processor (CPU) 11 may be formed as a time change rate calculating unit which calculates the time change rate based on the terminal voltage value and the measured time data stored in the SRAM 14 and performs an alarm informing operation depending on the residual capacity of a first power source (battery 23) based on magnitude of the calculated time change rate of the terminal voltage. The informing operation may be performed by displaying the alarm on the display device (LCD/MDI unit 70) of the numerical controller 10.

Figure 4:
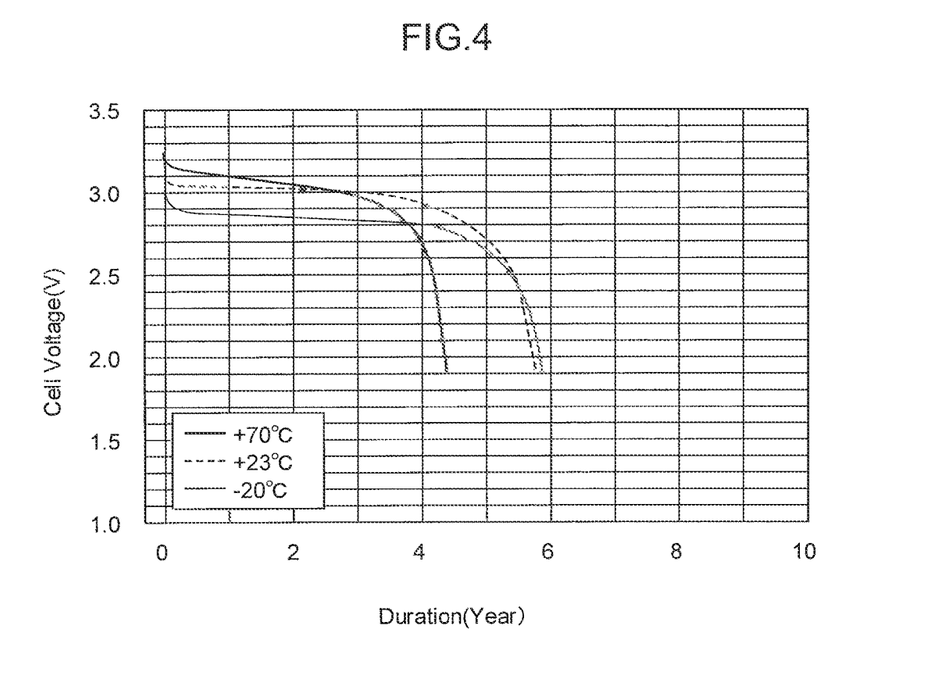
FIG. 4 is a graph showing a relationship between voltage and duration of the battery in each temperature.

As shown in FIG. 4, in the battery 23, the terminal voltage of the battery tends to be detected higher by the voltage detection circuit 16 as the temperature of the battery 23 is high. Thus, the terminal voltage is corrected based on a certain temperature as a reference. The relationship between the terminal voltage and the battery duration in which all of the detected terminal voltage is corrected as the temperature of the battery 23 is converted into 23° C. is indicated. Formula 1 is an example to perform a temperature correction by a quadratic approximate expression.

$$Y=3e\times10^{-5}X^2-0.0056X+0.1135 \qquad \text{(Formula 1)}$$

X: a measured temperature (° C.)
Y: a correction value to convert the voltage as the temperature is 23° C.

Here, the approximate expression is not limited to the quadratic approximate expression, and an approximate expression having a degree of more than 2 may be used.

Figure 5:
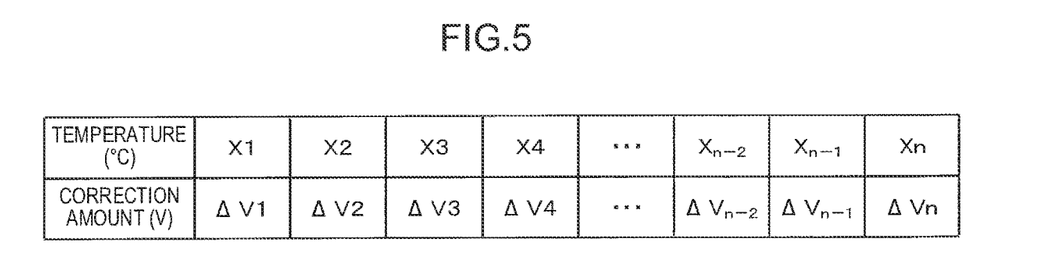
FIG. 5 is a correction table.

Alternatively, a correction table which indicates the characteristic of the battery 23 measured in advance may be made and the terminal voltage may be corrected based on the table. FIG. 5 shows a correction table. The table is made by measuring a correction value (ΔV) in advance to correct the voltage value of the terminal voltage in each measured temperature to be the terminal voltage in the reference temperature (for example 23° C.). Alternatively, the table is made from values calculated by the approximate expression such as the formula 1. The temperature is measured by for example such a degree of 0.1° C., and the correction value for the temperature between the measured temperatures is obtained by interpolation.

Figure 6:
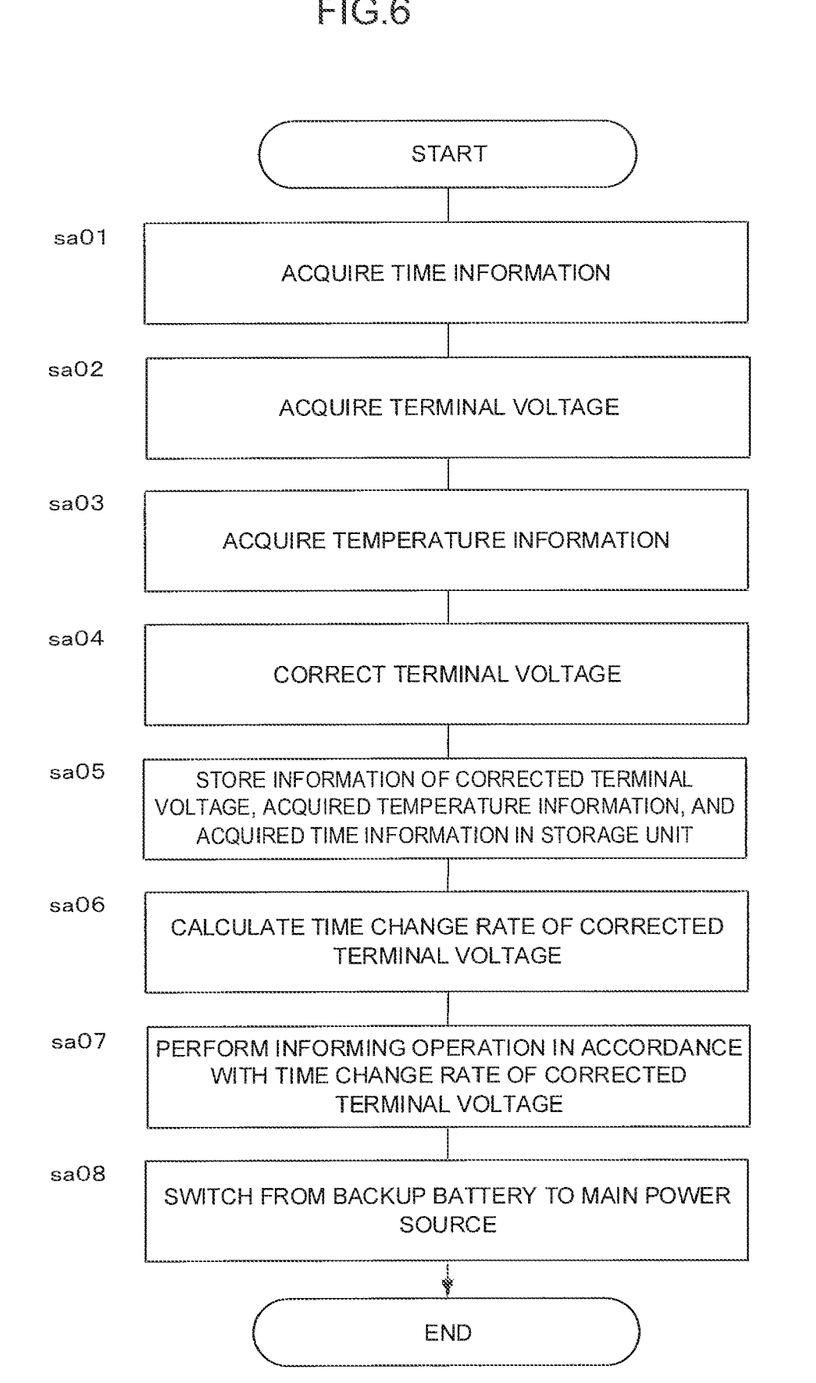
FIG. 6 is a flow chart showing a flow of a processing which displays the battery residual capacity in several stages.

FIG. 6 is a flow chart showing a flow of a processing which displays the battery residual capacity in several stages. Hereinafter, respective steps are described.

The processing shown in FIG. 6 is performed when the numerical controller 10 of the processing machine shown in FIG. 1 is activated and the CPU 11 is turned into an operation state. When the numerical controller 10 is being activated and this processing is being performed, electric power is supplied to the SRAM 14 and the RTC circuit 15 from the battery 23.

[Step sa01] Time information is acquired. For example, the CPU 11 reads the present time information from the RTC circuit 15.

[Step sa02] The terminal voltage is acquired. The terminal voltage of the battery 23 is detected by the voltage detection circuit 16 in a state in which the SRAM 14 and the RTC circuit 15 are connected to the battery 23, and then the CPU 11 reads the detected terminal voltage.

[Step sa03] Temperature information is acquired. The temperature of the battery 23 is detected by the temperature detector 25, and then the CPU 11 reads the detected temperature.

[Step sa04] The terminal voltage acquired in the Step sa02 is corrected. The correction is performed by using the formula 1 or the correction table shown in FIG. 5.

[Step sa05] Information of the terminal voltage corrected in the Step sa04, the temperature information acquired in the Step sa03, and the time information acquired in the Step sa01 are stored in a storage unit. The SRAM 14 may be used as the storage unit.

[Step sa06] The time change rate of the corrected terminal voltage is calculated based on the information stored in the Step sa05 (time change rate calculating unit).

[Step sa07] The informing operation in accordance with the time change rate of the corrected terminal voltage calculated in the Step sa06 is performed in several stages (informing unit). For example, residual capacity 50%, residual capacity 30%, or residual capacity 10% may be displayed. Further, a warning such as a warning sound for replacing the battery 23 may be made when the time change rate exceeds a predetermined value. By setting a plurality of values in advance, the warning can be made in several stages.

[Step sa08] It is switched to the main power source from the backup battery, and the processing is ended. It is switched to the main power source 22 from the battery 23 by the power source switching circuit 24.

The aforementioned flow chart is additionally described below.

In a case in which the temperature of the battery is not changed largely, the detection of the temperature of the battery may be omitted and the temperature correction of the terminal voltage may not be performed.

Further, since the measured temperature is used for correcting the terminal voltage, the measured temperature is only used for correcting the terminal voltage and may not be stored. By using the stored temperature information, the relationship between the residual capacity and the temperature of the battery can be checked as needed, and therefore the stored temperature information can be used for temperature management of the battery 23.

Figure 7:
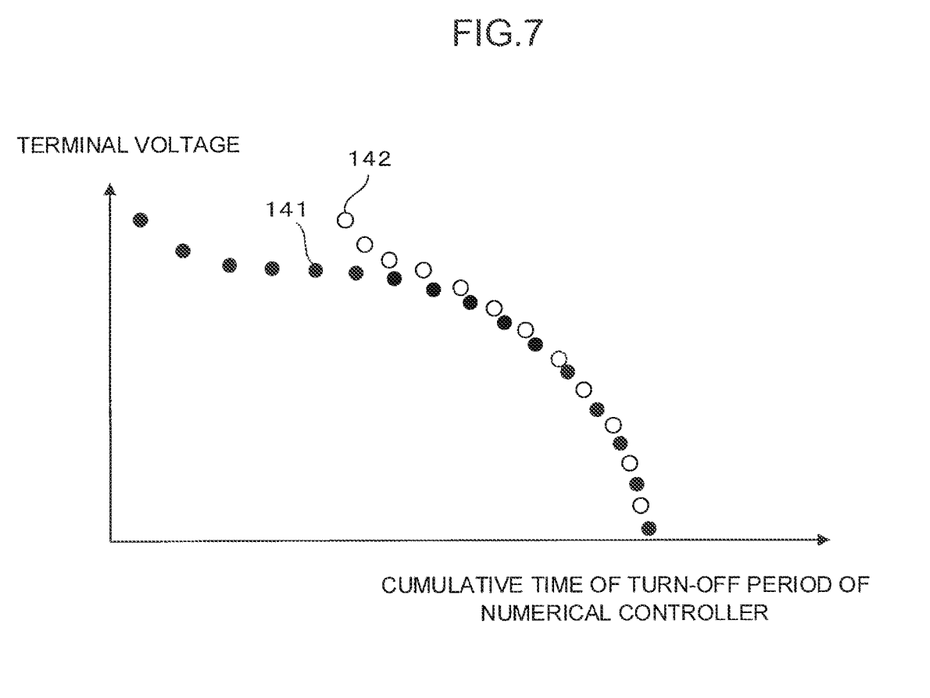
FIG. 7 is a graph showing a relationship between the terminal voltage of the battery and the cumulative time of the turn-off period of the numerical controller.

Here, when the battery 23 is left in a no-load state, the voltage becomes temporarily higher, and therefore the voltage is not returned to the original value unless the battery 23 is energized for a while. For example, this phenomenon occurs when the numerical controller 10 is restarted in a short time after the numerical controller 10 is operated for a long time and the operation of the numerical controller 10 is once stopped. As shown in FIG. 7, it may occur when the terminal voltage of the battery 23 is measured after the terminal voltage of the battery 23 is measured by using reference number 141 and the numerical controller 10 is operated for a long time and the operation of the numerical controller 10 is stopped and the main power source 22 is turned off and the numerical controller 10 is restarted in a short time.

In order to avoid this problem, in a case in which higher terminal voltage is detected compared to the previous detection value of the terminal voltage, after the numerical controller 10 is started, the energizing time from the main power source 22 to the load (SRAM 14, RTC circuit 15) is set to be longer until the inclination becomes a predetermined value within a range from the previously calculated result. Here, the predetermined value may be set by a selectable parameter.

For example, in FIG. 7, the time change rate of the terminal voltage in the reference number 141 is largely different from the time change rate of the terminal voltage in the reference number 142. Thus, switching to the main power source 22 from the battery 23 is performed after difference between the time change rate of the measured terminal voltage and the time change rate of the terminal voltage calculated by using the reference number 141 becomes within a predetermined range. Alternatively, in a case of the reference number 141 or the reference number 142, the time is set in advance, and the switching to the main power source 22 from the battery 23 may be performed after the set time is passed.

The switching to the main power source 22 from the battery 23 by the power source switching circuit 24 corresponds to "switches electric power supply to the load unit to the second power source from the first power source after a predetermined time is passed since an outside power source which supplies electric power to the electric device is turned on" in claims.

Here, description of claims is described.

A predetermined load unit corresponds to the SRAM 14 or the RTC circuit 15 which is backed up by the battery 23 as one example of a first power source and to which electric power is supplied from the main power source 22 as one example of a second power source, and the predetermined load unit may include, for example, the position velocity detector which detects the position and the velocity of the servo motors 50 to 52. A time measuring unit which measures the time corresponds to the RTC circuit 15 which counts the time.

The main power source 22 and the battery 23 are switched to be connected to the predetermined load unit by the power source switching circuit 24 as a switching unit. The voltage detection circuit 16 as a voltage measuring unit, which measures the terminal voltage of the first power source (battery 23), measures the terminal voltage of the first power source (battery 23) within a predetermined time period after power supply from a second power source (main power source 22) becomes possible.

A detection value of the terminal voltage of the first power source (battery 23) detected by the voltage detection circuit 16 and the time when the terminal voltage is detected are acquired based on the output from the RTC circuit 15. The detection value of the terminal voltage and the data of the time are stored in the SRAM 14 as a storage unit. The CPU 11 calculates the time change rate of the terminal voltage of the battery 23 (time change rate calculating unit) and informs the battery residual capacity in accordance with the time change rate acquired by the calculation, or alternatively informs the alarm in accordance with the battery residual capacity (informing unit).

The invention claimed is:

1. A device controller comprising:
   a first power source which supplies electric power from an internal power source to electrical devices of the controller;
   a second power source which supplies electric power from an outside power source to the electrical devices of the controller;
   a switch which switches the first power source and the second power source which supply electric power to the electrical devices of the controller;
   the electrical devices of the controller including:
      a clock for measuring time;
      a voltage detection circuit for measuring a terminal voltage value of the first power source;
      a non-volatile memory device for storing the terminal voltage value of the first power source and the time when the terminal voltage value of the first power source is measured;
      a processor for calculating a time change rate of the terminal voltage value of the first power source stored in the non-volatile memory device, the time change rate is calculated as a change in the terminal voltage value over a cumulative time of a turn-off period of the device controller as measured by the clock, and for calculating a residual capacity of the first power source in accordance with the time change rate of the terminal voltage value of the first power source; and
      an output device for outputting visual or audible information based on the residual capacity.

2. The electric device according to claim 1, wherein the switch switches electric power supply to the electrical devices of the controller to the second power source from the first power source after a predetermined time is passed since the outside power source which supplies the electric power to the electric device is turned on.

3. The electric device according to claim 1, further comprising:
- a temperature detector which measures temperature of the first power source,
- wherein the processor corrects the terminal voltage value of the first power source measured based on the temperature measured by the temperature detector,
- wherein the terminal voltage value of the first power source corrected by the processor is stored as the terminal voltage value of the first power source in the non-volatile memory device.

4. The electric device according to claim 3, wherein the processor corrects the measured terminal voltage value of the first power source by using an approximate expression having a degree of more than 1 or a correction table.

5. The electric device according to claim 1, wherein the output device informs a warning when the time change rate of the terminal voltage value of the first power source exceeds a predetermined value.

6. The electric device according to claim 1, wherein the temperature detector measures the temperature of the first power source when the terminal voltage value of the first power source is measured, and
- the non-volatile memory device stores the measured temperature together with the terminal voltage value of the first power source and the time.

* * * * *